(12) United States Patent
Ogun et al.

(10) Patent No.: US 11,393,346 B1
(45) Date of Patent: Jul. 19, 2022

(54) LOCATION BEACON USING PRE-EXISTING INFRASTRUCTURE

(71) Applicant: Amazon Technologies, Inc., Seattle, WA (US)

(72) Inventors: Denis Ogun, Cambridge (GB); Adam Mulligan, Cambridge (GB); Hillel Moshe Saul Baderman, London (GB)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 16/005,197

(22) Filed: Jun. 11, 2018

(51) Int. Cl.
| G08G 5/00 | (2006.01) |
| H04L 12/28 | (2006.01) |
| G01C 21/20 | (2006.01) |
| G06Q 10/08 | (2012.01) |
| H04W 4/021 | (2018.01) |
| H04W 4/40 | (2018.01) |
| B64C 39/02 | (2006.01) |
| G06V 20/13 | (2022.01) |

(52) U.S. Cl.
CPC ......... *G08G 5/0047* (2013.01); *B64C 39/024* (2013.01); *G01C 21/20* (2013.01); *G06Q 10/083* (2013.01); *G06V 20/13* (2022.01); *G08G 5/0073* (2013.01); *H04L 12/2818* (2013.01); *H04W 4/021* (2013.01); *H04W 4/40* (2018.02); *B64C 2201/128* (2013.01)

(58) Field of Classification Search
CPC .................................................. G08G 5/0047
USPC ...................................................... 701/32.2
See application file for complete search history.

(56) References Cited

U.S. PATENT DOCUMENTS

| 9,714,089 | B1 * | 7/2017 | Louw ...................... B64C 27/08 |
| 9,887,775 | B2 * | 2/2018 | Puscasu ................. H04B 10/11 |
| 9,961,507 | B1 * | 5/2018 | Mendelson ........... H04W 48/10 |
| 10,067,503 | B2 * | 9/2018 | Li ........................... G01S 19/14 |
| 2003/0004814 | A1 * | 1/2003 | Roseen ................ G06Q 20/203 |
| | | | 705/22 |
| 2006/0069463 | A1 * | 3/2006 | Kim .................. G08B 13/19695 |
| | | | 318/568.12 |

(Continued)

FOREIGN PATENT DOCUMENTS

| KR | 20150138735 A | * | 6/2014 |
| WO | WO2015077767 A1 | * | 11/2013 |

OTHER PUBLICATIONS

Novo, Oscar, Blockchain Meets IOT: An Architecture for Scalable Access Management In IOT, IEEE Internet of Things Journal (vol. 5, Issue: 2, Apr. 2018) (https://ieeexplore.ieee.org/abstract/document/8306880).*

*Primary Examiner* — Jean Paul Cass
(74) *Attorney, Agent, or Firm* — Lee & Hayes, P.C.

(57) ABSTRACT

A location identifying solution may use a pre-existing infrastructure of smart hubs and smart devices on user's properties to provide location beacons. An autonomous delivery vehicle may request a location signal from the server when nearing a destination for an order. The server may identify a smart hub with connected devices (e.g., light bulbs, speakers, etc.) associated with the user originating the order. The server may generate and transmit beaconing information to the hub. The hub may cause the devices to output a beacon (e.g., to flicker light at a frequency that is undetectable to human eye). Using a computer vision algorithm, the vehicles could detect the beacon and determine the correct property.

20 Claims, 6 Drawing Sheets

(56) References Cited

U.S. PATENT DOCUMENTS

| | | | |
|---|---|---|---|
| 2012/0194479 A1* | 8/2012 | Stark | G06F 3/0428 345/175 |
| 2014/0368601 A1* | 12/2014 | deCharms | H04L 67/26 348/14.02 |
| 2015/0109104 A1* | 4/2015 | Fadell | G06F 21/44 340/5.7 |
| 2015/0109112 A1* | 4/2015 | Fadell | G08B 19/005 340/328 |
| 2015/0109128 A1* | 4/2015 | Fadell | G08B 25/008 340/540 |
| 2015/0112885 A1* | 4/2015 | Fadell | G08B 29/185 705/330 |
| 2015/0116106 A1* | 4/2015 | Fadell | G06Q 10/0631 340/501 |
| 2015/0116107 A1* | 4/2015 | Fadell | G06Q 10/083 340/501 |
| 2015/0116108 A1* | 4/2015 | Fadell | G08B 27/003 340/501 |
| 2015/0116109 A1* | 4/2015 | Fadell | G06Q 10/0631 340/501 |
| 2015/0120015 A1* | 4/2015 | Fadell | G06Q 10/083 700/90 |
| 2015/0120596 A1* | 4/2015 | Fadell | G08B 19/005 705/330 |
| 2015/0120598 A1* | 4/2015 | Fadell | G06Q 10/083 705/333 |
| 2015/0127712 A1* | 5/2015 | Fadell | H04L 12/2807 709/202 |
| 2015/0145643 A1* | 5/2015 | Fadell | G08B 29/185 340/5.51 |
| 2015/0154850 A1* | 6/2015 | Fadell | G06Q 10/083 340/501 |
| 2015/0156030 A1* | 6/2015 | Fadell | G08B 25/008 700/90 |
| 2015/0156031 A1* | 6/2015 | Fadell | G08B 29/185 700/90 |
| 2016/0033966 A1* | 2/2016 | Farris | A47G 29/122 701/16 |
| 2016/0107749 A1* | 4/2016 | Mucci | G06Q 50/26 701/3 |
| 2017/0091710 A1* | 3/2017 | Van Dyke | A47G 29/141 |
| 2017/0105129 A1* | 4/2017 | Teplin | H04L 41/12 |
| 2017/0126907 A1* | 5/2017 | Tamura | H04N 1/00244 |
| 2018/0114451 A1* | 4/2018 | Foina | G08G 5/0069 |
| 2018/0233038 A1* | 8/2018 | Kozloski | B60W 40/09 |
| 2019/0130342 A1* | 5/2019 | Maheshwari | H04W 4/70 |
| 2019/0149322 A1* | 5/2019 | Bar-Nahum | H04L 9/0643 380/278 |
| 2019/0259232 A1* | 8/2019 | Nandakumar | G07C 9/00896 |

* cited by examiner

LOCATION BEACON USING PRE-EXISTING INFRASTRUCTURE

BACKGROUND

Most online consumers, at one point or another, may experience the disappointment of a delayed delivery, or worst yet, delivery to an incorrect location. This is due, in part, to the difficulty in determining the correct property for a delivery. With homes becoming more and more densely packed in urban environments, determining the correct property for delivery may also be more and more challenging. Additionally, while this challenging problem may be difficult for a human delivery driver, it is even more difficult to solve for an autonomous vehicle. For example, a human delivery driver may be able to ask another person for help and/or use her natural intuition in situations where a property doesn't have a number on it and know to look at the neighboring properties to determine the correct property. However, an autonomous delivery vehicle does not have this natural intuition. Because of this difference, an autonomous delivery vehicle may need different solutions to help determine the correct property.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
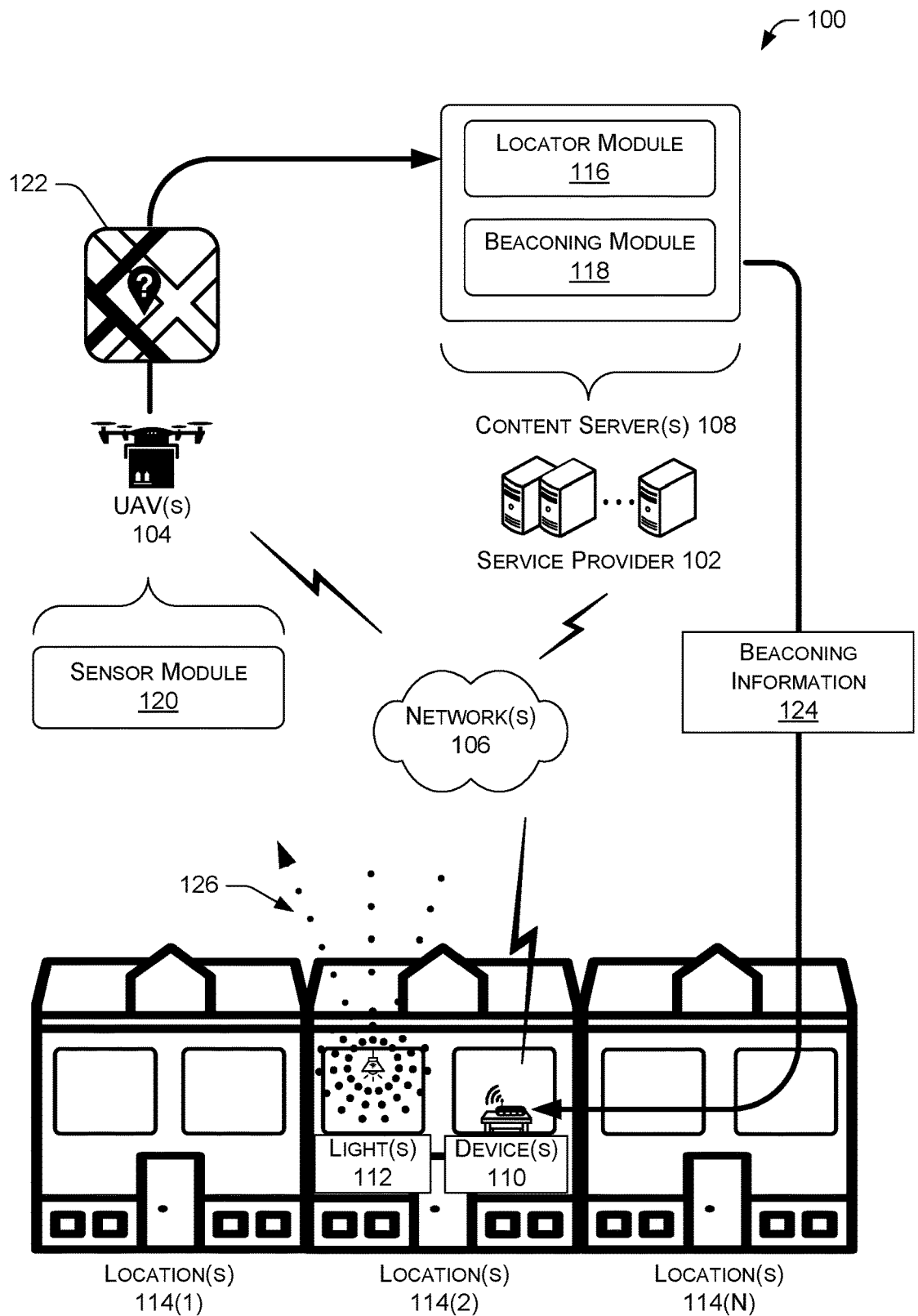
FIG. 1 is a schematic diagram showing an example system for a location identifying system that leverages a pre-existing infrastructure of an Internet of Things (IoT) hub that controls a smart light to provide beaconing information.

This disclosure is directed to a location identifying solution that leverages a pre-existing infrastructure to provide location beacons by using a network of user registered smart hubs and lights to provide beaconing information. Initially, a service provider may use a user registered smart hub with Internet of Things (IoT) connected devices (e.g., lightbulbs, speakers, etc.) on the user's property to provide beaconing information for autonomous vehicles that are delivering the user's orders. The service provider may also request the user's consent to share the smart hub and IoT devices as part of a beaconing system network. The system may generate beaconing information for a smart hub to broadcast. The smart hub may cause the IoT device to broadcast the beaconing information such as by flickering the light at a frequency that is undetectable by human eyes but is detectable to cameras or sensors on delivery vehicles.

The system may include a beaconing system network, that is a network of IoT devices identified as controlling beaconing capable lightbulbs. In response to receiving a location-based task (e.g., order delivery, emergency supply delivery, etc.), the system may select a vehicle for the task and transmit the task information (e.g., task identifier, order number, delivery vehicle identifier, delivery location, routing information, user specific delivery instruction, etc.) to the vehicle. The vehicle may be any unmanned aerial vehicles (UAVs), delivery robots, and/or other delivery vehicles that are fitted with one or more sensors capable of detecting light flickering at a frequency that is undetectable by the human eyes but may be detected by the sensors.

As the vehicle approaches a target location, the vehicle may send a beaconing request to the system. In response to the request, the system may identify a smart hub that is associated with the property and that is controlling an IoT connected lightbulb. The server may generate beaconing information including a portion of the task information (e.g., order number, vehicle identifier, task identifier, etc.) to identify the light source as being the correct target location. Based on receiving the beaconing information, the IoT hub may cause the light to broadcast the information by flickering the beaconing information. The vehicle may receive the beaconing information and may notify the server to stop flickering the beaconing information.

A service provider using this location identifying system may provide a portal for users to register user accounts and to link their IoT hubs and connected IoT devices. The users may opt-in to share their personal IoT network to similarly receive support from other users' devices, thus joining the beaconing system network. For example, a user may register their IoT network with the service provider to be used as part of the beaconing system network. In return for joining the beaconing system network, if a delivery vehicle is unable to identify the user's home, the service provider may use a smart hub associated with the originating user and/or a nearby beaconing network device to provide guidance. The beaconing system network may geographically map the locations of the IoT devices and may use the IoT devices located along a delivery route as interim signaling beacons.

This location identifying solution provides a number of advantages over the traditional location identifying solutions, such as providing a faster and more accurate method for determining the correct target location without requiring dedicated infrastructure or additional hardware installation. Additionally, this location identifying solution provides a technical solution to the technical problem of determining the correct delivery property that may have hard to find or hidden property identifier for an autonomous vehicle. This system may also provide location identification for delivery destination that may not have specific property identification. For example, an emergency response UAV may be delivering medical equipment or supply to the scene of a medical emergency, which may be on the sidewalk or at the corner of a public park. The system having access to a public portal to control street lights or park lights may be able to help guide the emergency response UAVs.

The techniques and systems described herein may be implemented in a number of ways. Example implementations are provided below with reference to the following figures.

FIG. 1 is a schematic diagram showing an example system 100 for a location identifying system that leverages a pre-existing infrastructure of an Internet of Things (IoT)

hub that controls a smart light to provide beaconing information. The system 100 may include users having device(s) 110 at their home locations, such as locations 114(1)-114(N). The unmanned aerial vehicle (UAV) 104 may be deployed to deliver items on behalf of a service provider 102 and may communicate with the service provider 102 over one or more network(s) 106. In some examples, the network(s) 106 may be any type of network known in the art, such as the Internet. Moreover, the service provider 102, the UAV(s) 104, and/or the device(s) 110 may communicatively couple to the network(s) 106 in any manner, such as by a wired or wireless connection.

The UAV(s) 104 may be any autonomous delivery vehicles, delivery robots, or delivery vehicles that is fitted with a computing device, with a light sensor or camera. Each UAV(s) 104 may implement a sensor module 120, which is stored in memory of the UAV(s) 104 and executable by one or more processors of the UAV(s) 104. The UAV(s) 104 may include any number and combination of cameras, controllers (e.g., flight controllers), sensors (e.g., thermal sensors, audio sensors, infrared sensors, accelerometers, pressure sensors, weather sensors, airflow sensors, proximity sensors, etc.), and systems (e.g., global positioning systems, navigation systems). A UAV 104 may be part of a fleet of UAVs 104 maintained and deployed by the service provider 102.

The service provider 102 may be any entity, server(s), platform, etc., that offers items, for purchase and subsequent delivery, for users. In some embodiments, the service provider 102 may also provide items (e.g., products, services, etc.) to consumers on behalf of merchant users. Additionally, the service provider 102 may provide a devices portal to allow device(s) 110 to communicate with a service provider's platform to integrate into the beaconing system network. As shown, the service provider 102 may include one or more content server(s) 108. The content server(s) 108 may be implemented in a non-distributed computing environment or may be implemented in a distributed computing environment, possibly by running some modules on UAV(s) 104, device(s) 110, or other remotely located devices. The content server(s) 108 may be any type of server, such as a network-accessible server.

In various examples, the service provider 102 may present items to the user(s) on behalf of itself, merchants, and/or other entities. The items may include products, services, digital items, or other types of items. Example products may include, but are not limited to, garments, shoes, jewelry, sporting goods, eyewear, headwear, handbags, toys, furniture, bedding, accessories, electronics, games, ornaments, furniture, appliances, arts and crafts, or other items. In at least one example, the service provider 102 described herein may cause one or more user interfaces to be presented to users via a computing device. The user interfaces may allow user(s) to place orders or register device(s) 110 with the service provider 102, among other possible uses.

The user(s) may be entities, such as business entities, or may be individuals or groups of individuals. The user may be associated with one or more device(s) 110. The user may interact with the service provider 102 via a site (i.e., a website), a service provider application, a brick-and-mortar location, a self-service interface, a self-service portal, or in any other manner. The user may interact with the service provider 102 to create a user account and associate one or more device(s) 110 with the user account through the user interface. Furthermore, the service provider 102 may generate and present user interfaces to allow user(s) to view the list of light(s) 112 that are controlled by the device(s) 110.

In some examples, the users may operate corresponding devices 110 to perform various functions associated with the device(s) 110, which may include at least some of the operations and/or modules discussed above with respect to the service provider 102. The device(s) 110 may be any computing devices, smart hubs, IoT hubs, or smart devices that control other IoT devices including the light(s) 112 within a home. The light(s) 112 may be any standard household light-emitting diode (LED) lights that is capable of flickering at a frequency high enough to be undetectable by human eyes. The light(s) 112 may be controlled by the device(s) 110.

In at least one configuration, the content server(s) 108 may include components that may be used to facilitate interaction between the service provider 102, the UAV(s) 104, and the device(s) 110 that are located at locations 114. For example, content server(s) 108 may include the locator module 116 and the beaconing module 118.

The locator module 116 may receive location data from a UAV 104 deployed on behalf of the service provider 102. Using the location data, the locator module 116 may determine if the UAV 104 is close enough to a destination to trigger broadcasting of beaconing information. If the locator module 116 determines the UAV 104 needs beaconing information, the beaconing module 118 may determine the signaling process.

The beaconing module 118 may include components to determine if the target location 114(2) has a device 110 with IoT connected light(s) 112 for location beaconing. The beaconing module 118 may retrieve a user account information associated with the order being delivered and determine if there are device(s) 110 and light(s) 112 associated with the account. Based on the determination that the user account has device(s) 110 and light(s) 112 registered to the same target location 114(2), the beaconing module 118 may generate beaconing information for the light(s) 112 to broadcast.

The sensor module 120 may receive and process data for the sensors on UAV 104, including but not limited to thermal sensors, light sensors, audio sensors, infrared sensors, accelerometers, pressure sensors, weather sensors, airflow sensors, and proximity sensors. The sensor module 120 may use one or more light filters and computer vision algorithms to receive the flickering light signal and convert the light signal into data containing the beaconing information. Additionally, the sensor module 120 may also determine the property that is beaconing. In at least one example, at least one or more components of the sensor module 120 may be stored and deployed by the content server(s) 108 to execute at UAV 104 to receive encrypted beaconing data and to decrypt the beaconing data.

As a non-limiting example, the example location beaconing loop starting with the example beacon request 122 illustrates an example solution to a UAV 104 requesting guidance from the service provider 102 to help determine the correct property to deliver to using the system 100. In the example location beaconing loop, the UAV 104 transmits the example beacon request 122 to the content server(s) 108. The locator module 116 may determine that the UAV 104 is within a threshold distance of a target location 114(2) and the beaconing module 118 may generate beaconing information 124. The content server(s) 108 may transmit the beaconing information 124 to the device 110. The device 110 may receive the beaconing information 124 and cause the light 112 to broadcast the beaconing information as the example flickering light 126. The sensor module 120 implemented by the UAV 104 may detect the example flickering light 126 and using computer vision algorithms, determine that the property with light 112 beaconing, is the correct delivery location 114(2).

Figure 2:
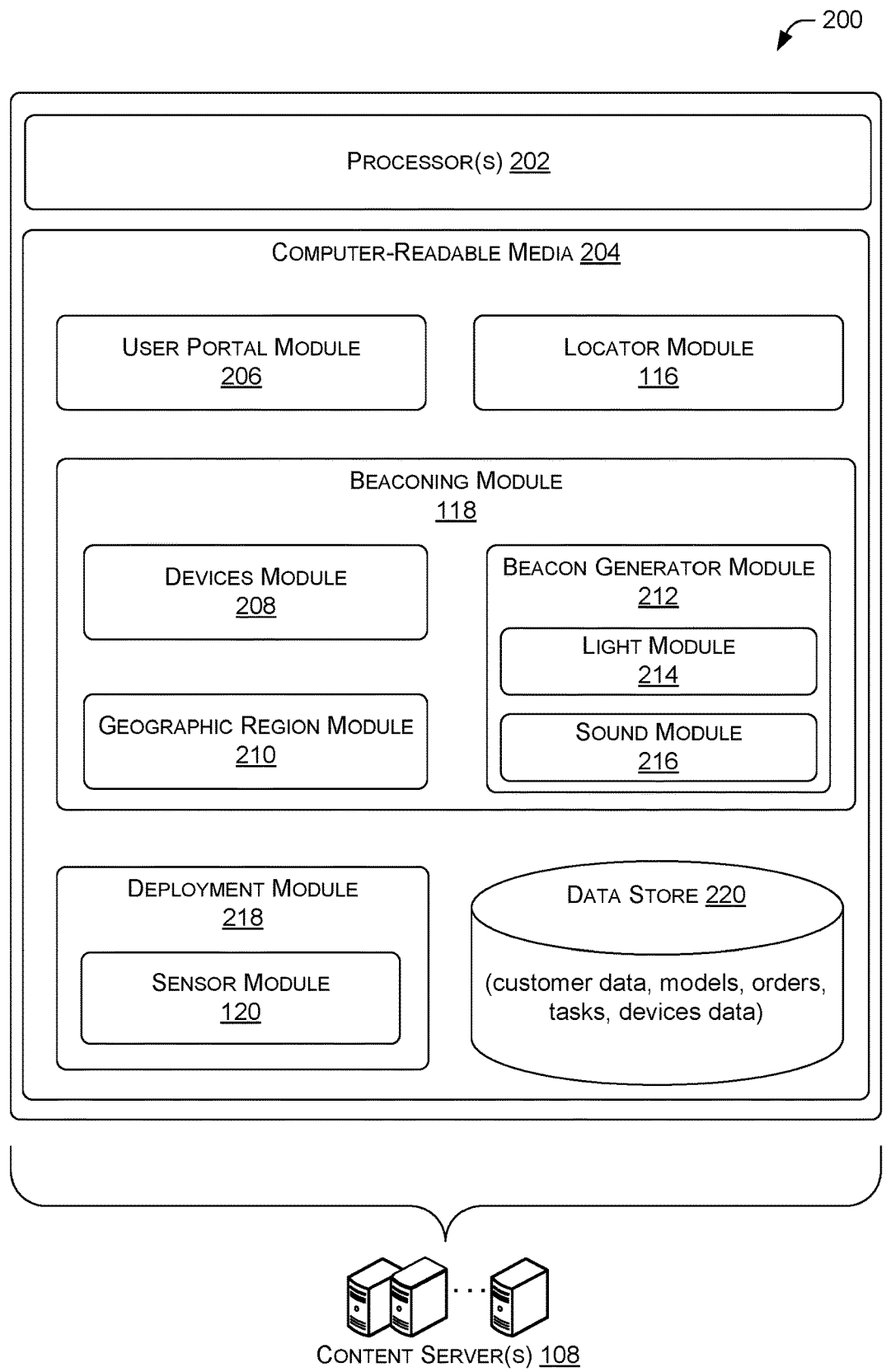
FIG. 2 is a block diagram of an illustrative computing architecture of a content server shown in FIG. 1.

FIG. 2 is a block diagram of an illustrative computing architecture 200 of the content server(s) 108. The computing architecture 200 may be implemented in a distributed or non-distributed computing environment.

The computing architecture 200 may include one or more processors 202 and one or more computer-readable media 204 that stores various modules, applications, programs, or other data. The computer-readable media 204 may include instructions that, when executed by the one or more processors 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some examples, the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

In some configurations, the computer-readable media 204 may store the user portal module 206, the locator module 116, the beaconing module 118 and associated components, the deployment module 218 and associated components, and the data store 220, which are described in turn. The components may be stored together or in a distributed arrangement.

The user portal module 206 may facilitate communication between the user(s) and the service provider 102. The user portal module 206 may present various user interfaces to communicate with the user(s). In an example, the user portal module 206 may present a user interface allowing the user(s) to create user accounts and place orders with the service provider 102. In at least one example, the user portal module 206 may receive information associated with user(s) such as personal information (e.g., billing information, location of home, specific delivery instructions including a placement location to leave packages, device(s) 110 at the location, lights controlled by the device 110, user consent to join the beaconing network).

The locator module 116 may receive location data from the UAV 104 associated with the service provider 102. Using the location data, the locator module 116 may determine if the UAV 104 is within threshold distance to a delivery location to trigger broadcasting of the beaconing information. In some examples, the threshold distance may be dynamically determined based on lighting conditions, including but not limited to, the lumens of the light(s) 112, the level of brightness based on weather or time of day, and light pollution of the city lights. In an additional and/or alternate example, the locator module 116 may also determine the threshold distance based a current ambient light level received from a light sensor on the UAV 104. The threshold distance may increase if the system determines that the beaconing light may be detected from a greater distance and conversely, the threshold distance may decrease if the system determines that the beaconing light may be detected from a shorter distance. For instance, if a delivery is being made later in the evening when there is less light out, the threshold distance may increase because the beaconing light may be detectable from afar. Or if a delivery is made during a sunny day, the threshold distance may decrease because the beaconing light may be detectable only when up close. In various examples, if the system determines that the device 110 is controlling a security floodlight located on the outside of the building, the threshold distance may increase. If the locator module 116 determines the UAV 104 needs beaconing information, the locator module 116 may interact with the beaconing module 118 to trigger a location signal.

The beaconing module 118 may include the devices module 208, the geographic region module 210, and the beacon generator module 212 and associated components. The beaconing module 118 may perform tasks related to determine the device 110 to send beaconing information to, and generating the beaconing information. In various examples, the beaconing module 118 may receive a delivery confirmation from the UAV 104 and may cause the device 110 to announce the delivery confirmation. The device 110 may announce the delivery confirmation by any human perceivable lights, sound, etc. In at least one example, at least one or more components of the beaconing module 118 may be stored and configured to execute at devices 110 located at beaconing locations. For instance, the sound module 216 residing at a beaconing location 114 may modulate the beaconing information as sound data.

In some examples, the beaconing module 118 may interact with the locator module 116 to determine that the UAV 104 is not near a final destination, but rather needs interim navigation guidance by beaconing signals. For instance, if it's foggy out, and the UAV 104 has trouble navigating, the UAV 104 may request interim navigation guidance. Additionally, the beaconing module 118 may interact with the locator module 116 to determine the signal types to use based on location and lighting conditions.

The devices module 208 may serve as a device gateway for the beaconing system network. Initially, the devices module 208 may interact with the user portal module 206 to serve as a device registration portal for the device(s) 110 before it is deployed or put to use. As part of registration, the devices module 208 may receive hub device information from the device(s) 110 itself or the hub device information may be manually added. The hub device information may include a unique identifier code, the hub type, the number of IoT devices the device(s) 110 is controlling including the number of light(s) 112, the type of light(s) 112, and the location of the device(s) 110. The devices module 208 may associate the unique device identifier code with a user account.

In various examples, if the device(s) 110 is a security system smart hub that has mapped out the security lights 112 installed on the building perimeter, the devices module 208 may receive and store the mapping information. In additional examples, the devices module 208 may receive a list of connected IoT devices from the device(s) 110 during a setup/configuration mode. For instance, while still in setup/configuration mode, the devices module 208 may generate an IoT index for the lights 112 based on input received from the device(s) 110.

In some examples, the devices module 208 may generate a light detectability index for the lights 112 to monitor the detectability (e.g., by score, level, percent, etc.) of each light(s) 112 based on whether any particular light(s) 112 having been triggered and used as beaconing lights before. For instance, if a particular light 112 have been successfully used as a beaconing light source, the light detectability index for that particular light 112 may be marked to indicate a high level of detectability. However, if a particular light 112 have been used as a beaconing light source, but the UAV 104 was not able to find that particular light 112, then the light detectability index may mark that particular light 112 as having low detectability. Based on the light detectability index for the lights 112, if an index is below a detectable threshold, that light may simply not used as part of the beaconing network.

In at least one example, the devices module 208 may receive manual input from a user entering the device configuration data for each device 110. The devices module 208 may present a user interface for a user to manually tag each light(s) 112 and select a detectability level based on visibility of the light(s) 112 from outside of the building.

The geographic region module 210 may track the geographic region of the devices 110 within a beaconing network. In some examples, the delivery route for a UAV 104 may be predetermined for a delivery task, and the geographic region module 210 may determine the network of devices 110 along the delivery route for use as beaconing guidance.

The beacon generator module 212 may include the light module 214 and the sound module 216. The beacon generator module 212 may generate beaconing information specific to the UAV 104 that requested the location beacon. In some examples, the beacon generator module 212 may include a vehicle identifier, the order or task number, or any other identifier to tag the beaconing information with an intended recipient tag for a particular order, task, or vehicle. In an additional and/or alternate example, the beacon generator module 212 may retrieve any specific delivery instructions associated with the user's account and the beaconing information may include the specific delivery instructions. The specific delivery instructions may specify a placement location to leave the package. In various examples, the beacon generator module 212 may encrypt any confidential portion of the beaconing information before transmitting the beaconing data. In response to receiving the beaconing data, the UAV(s) 104 may verify the intended recipient tag.

In some examples, the beacon generator module 212 may generate beaconing information that includes additional traveling instructions based on the UAV 104 being too far from a final destination. The additional traveling instructions may include a new flight plan or new Global Positioning System (GPS) coordinates for the UAV 104. In various examples, the beacon generator module 212 may generate beaconing information that includes additional delivery instructions based on the UAV 104 being next to a delivery location but the delivery location does not have a beaconing light on the property, thus the additional delivery instructions may direct the UAV 104 to deliver to a specific neighboring property.

The light module 214 may determine the flickering frequency and pattern to broadcast the beaconing information. Initially, the light module 214 may identify the type of bulb that is connected to the device(s) 110 and determine a flickering frequency suitable for the type of the bulb. In some examples, if a device 110 is connected to more than one light 112, the light module 214 may select one or more light(s) 112 that is best suited for beaconing purpose. For instance, if a device 110 is controlling a floodlight above the garage, a set of path lights, and a few lights for the bedrooms, the light module 214 may select the floodlight and path lights for beaconing.

The sound module 216 may modulate the beaconing information as sound data. As described above, the locator module 116 may determine the signal types to use based on location and lighting conditions, if the lighting conditions creates a detectability issue for beaconing, the sound module 216 may cause the devices 110 to broadcast the sound data. In various examples, the sound module 216 may be stored and configured to execute at devices 110 and modulate the beaconing information at the location 114.

The deployment module 218 may include the sensor module 120. The deployment module 218 may serve as a gateway for the vehicles or devices on the vehicles. Initially, the deployment module 218 may interact with the UAV(s) 104 to provide task or order information including delivery route and target destination before it is deployed. The deployment module 218 may perform tasks related to deploying the UAV(s) 104 and managing the modules pushed out the UAV(s) 104 before deploying them. In some examples, the deployment module 218 may transmit decryption keys to the UAV(s) 104 to decrypt encrypted beaconing data and information that the UAV(s) 104 receive. In particular, because the beaconing information may contain confidential information that may be unintentionally broadcasted to other light sensors, the deployment module 218 may verify that the UAV(s) 104 has the correct decryption keys. In additional examples, the deployment module 218 may verify that the UAV(s) 104 has the correct version of the sensor module 120.

The sensor module 120 may include one or more light filters and computer vision algorithms to detect flickering light and determine beaconing information from the flickering. The sensor module 120 may also include computer vision algorithms to determine the property that is beaconing. In at least one example, at least one or more components of the sensor module 120 may be stored and deployed by the content server(s) 108 to execute at UAV(s) 104 to receive encrypted beaconing data and to decrypt the beaconing data.

The sensor module 120 may train one or more of machine learning models stored in the data store 220. Machine learning generally involves processing a set of examples (called "training data") in order to train a machine learning model. A machine learning model, once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In the context of the present disclosure, the unknown input may include, inter alia, light sources that is received by sensors, and the trained machine learning model may be tasked with classifying the unknown input as one of multiple class labels. The class labels, in this case, may correspond to a classification of the unknown data as a type of data among multiple different types of data corresponding to different light information (e.g., irrelevant beaconing information, non-beaconing light, relevant destination beaconing information, relevant pathfinding beaconing information, etc.).

The machine learning model(s) may represent a single model or an ensemble of base-level machine learning models, and may be implemented as any type of machine learning model. For example, suitable machine learning models for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models, as stored in the data store 220, whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The data store 220 may store at least some data including, but not limited to, data collected from user portal module 206, locator module 116, beaconing module 118, and deployment module 218, including data associated with customer data, devices data, beaconing network data, and vehicle data. In some examples, the data may be automatically added via a computing device (e.g., content server(s) 108). Customer data, beaconing network data, and devices data may correspond to one or more entity(s) associated with the service provider 102. In various examples, customer data may include information associated with the user preference, payment information, account information, delivery locations, the locations of the devices, user consent for beaconing network, etc. The devices data may include all the information related to the smart devices, including the connected IoT devices, the locations of the IoT devices, the types of IoT connected lightbulbs, and the lights location mapping. The beaconing network data may include the roster of registered smart devices that may be shared and the light detectability index. The vehicle data may include identification tags for each vehicle deployed by the service provider 102. In additional or alternative examples, at least some of the data may be stored in a cloud storage system or other data repository.

Figure 3:
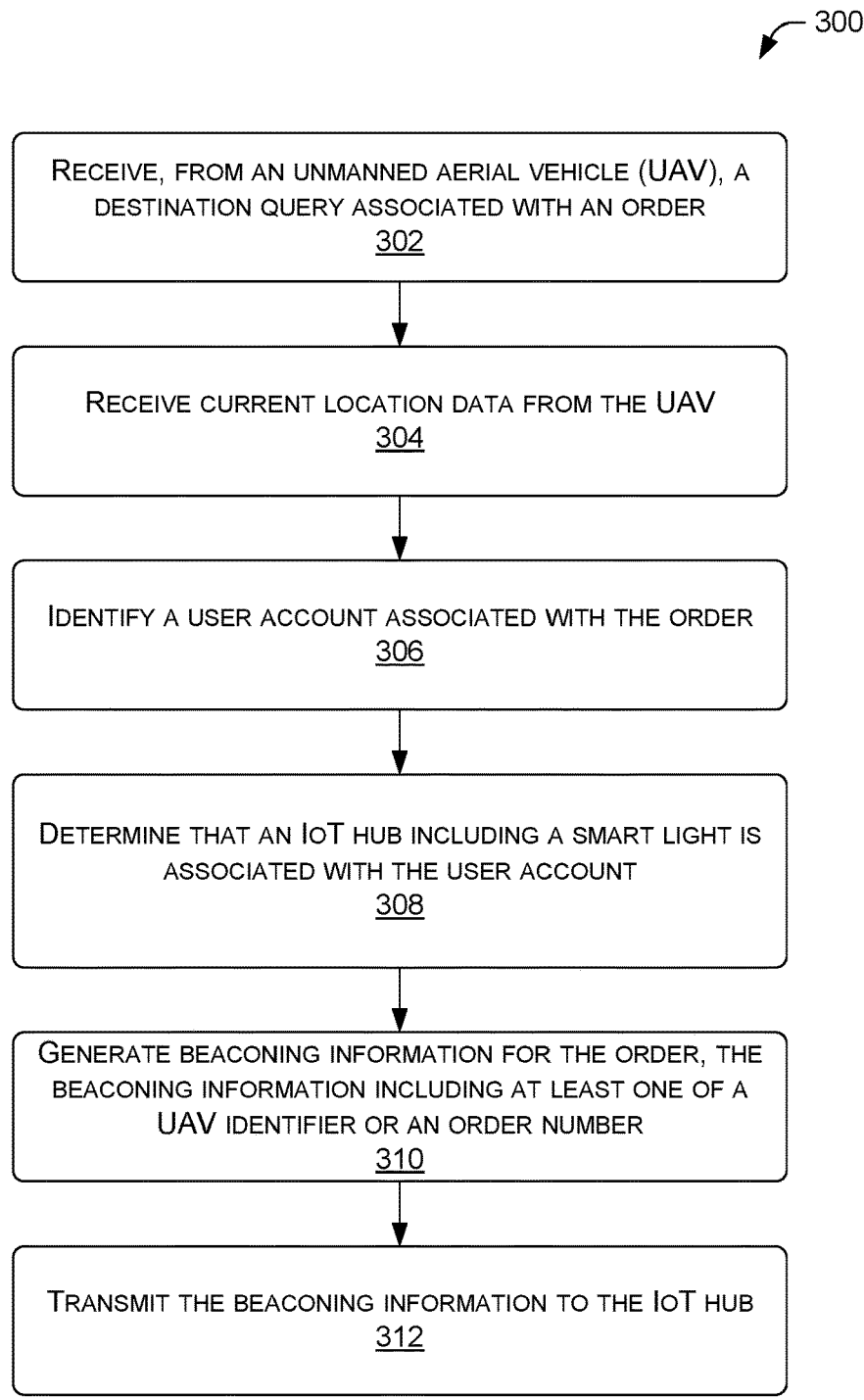
FIG. 3 is a flow diagram of an illustrative process for receiving a beaconing request and generating beaconing information for guidance.
Figure 5:
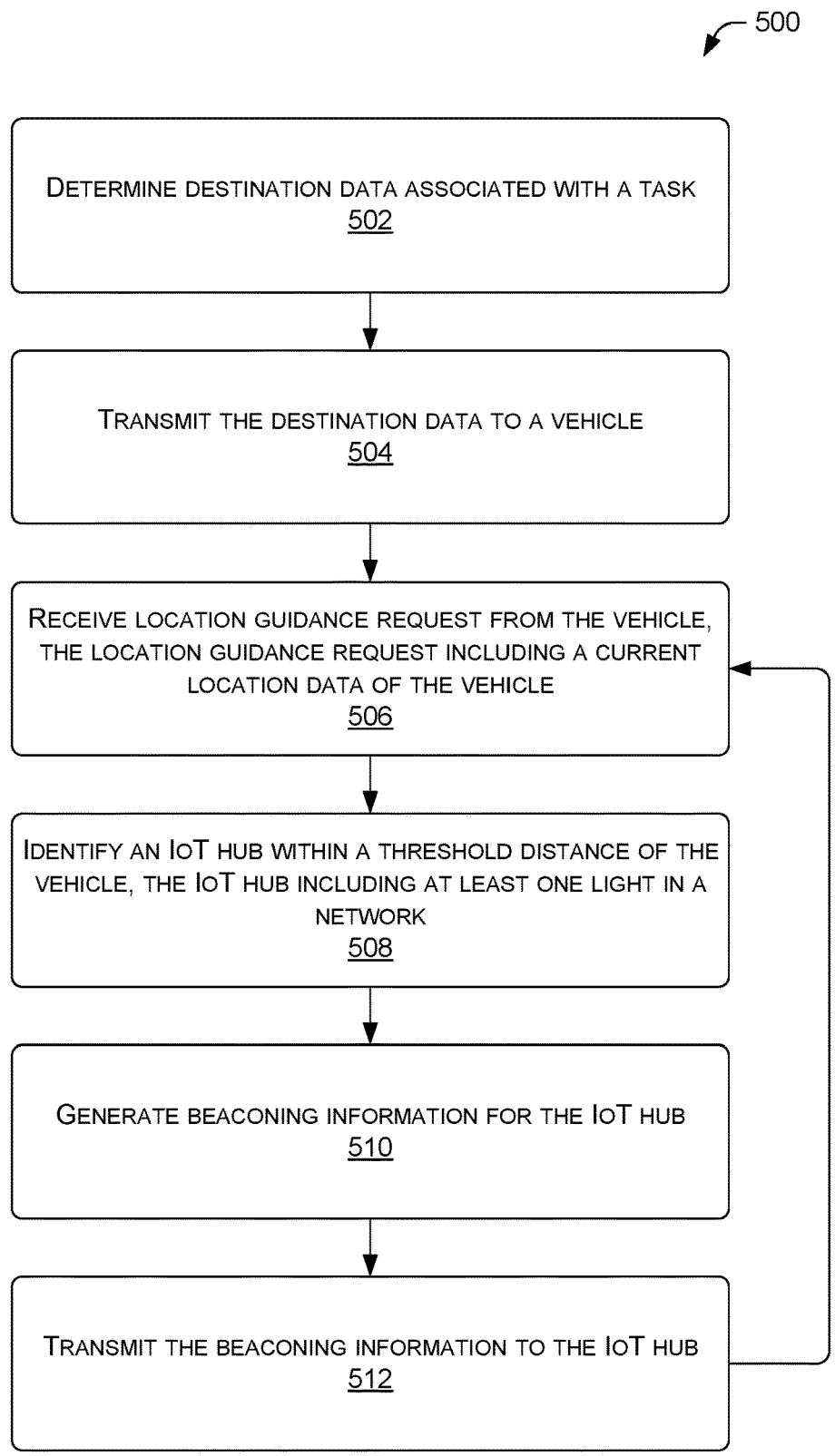
FIG. 5 is a flow diagram of an illustrative process for providing continuous location guidance beacons to guide a vehicle toward a destination.
Figure 6:
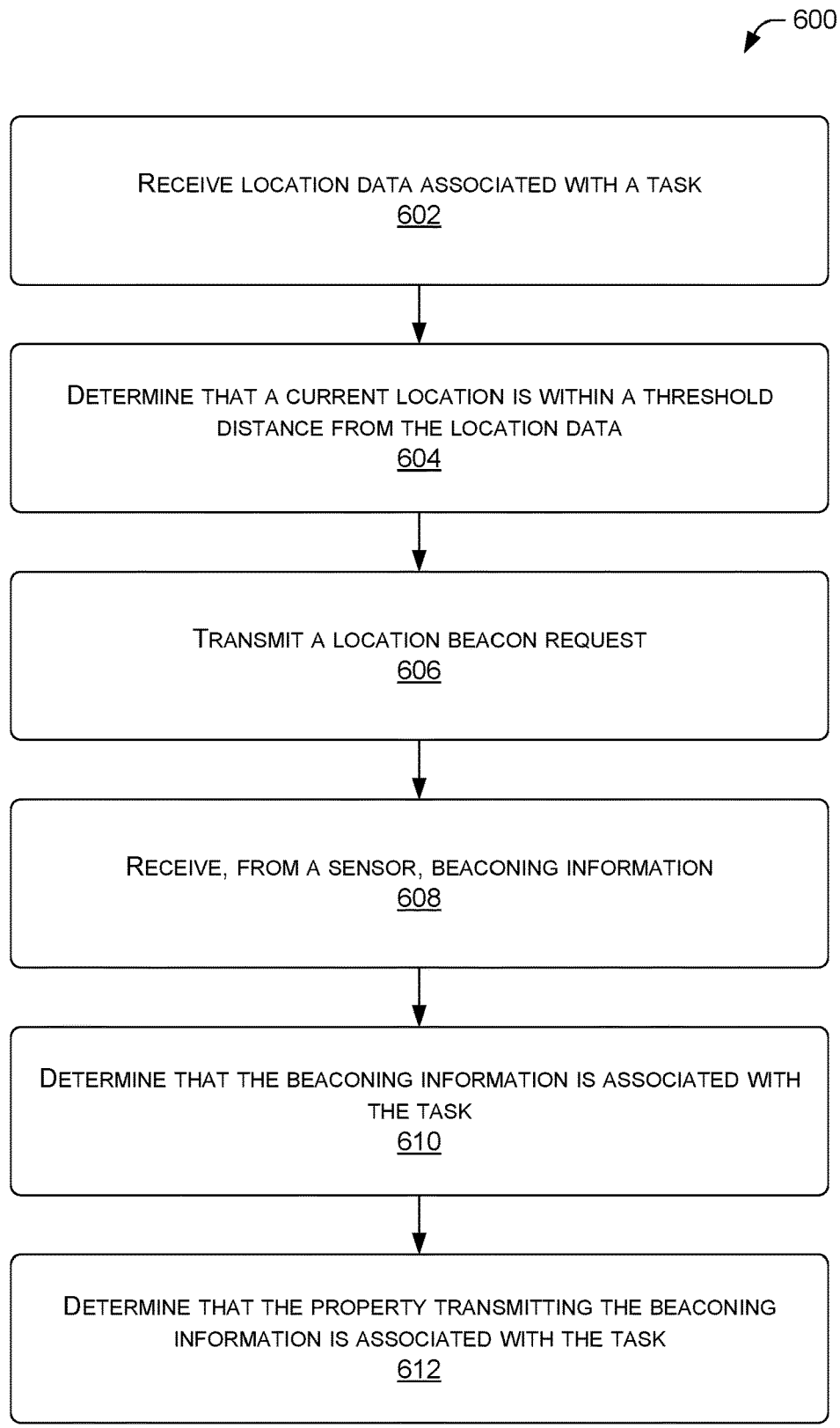
FIG. 6 is a flow diagram of an illustrative process for transmitting a request for location guidance, detecting a beaconing pattern, and determining the location based on the beaconing information.

FIGS. 3, 5, and 6 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 3 is a flow diagram of an illustrative process 300 for receiving a beaconing request and generating beaconing information for guidance. The process 300 is described with reference to the system 100 and may be performed by the content server(s) 108 and/or in cooperation with any one or more of the UAVs 104 and devices 110. Of course, the process 300 may be performed in other similar and/or different environments.

At 302, the beaconing module 118 may receive, from an unmanned aerial vehicle (UAV), a destination query associated with an order. The beaconing module 118 may interact with the locator module 116 to determine whether or not the UAV 104 is near a final destination based on the shipping address of the order. Additionally, the beaconing module 118 may interact with the locator module 116 to determine the signal types to use based on location and lighting conditions.

At 304, the locator module 116 may receive current location data from the UAV. The locator module 116 may receive location data from the UAV 104 associated with the service provider 102. Using the location data, the locator module 116 may determine if the UAV 104 is within threshold distance to a delivery location to trigger broadcasting of the beaconing information. In some examples, the threshold distance may be dynamically determined based on lighting conditions, including but not limited to, the lumens of the light(s) 112, the level of brightness based on weather or time of day, and light pollution of the city lights.

At 306, the user portal module 206 may identify a user account associated with the order. Initially, the user portal module 206 may facilitate communication between the user(s) and the service provider 102. In an example, the user portal module 206 may present a user interface allowing the user(s) to create user accounts and place orders with the service provider 102. In at least one example, the user portal module 206 may receive information associated with user(s) such as personal information (e.g., billing information, location of home, user specific delivery instructions for delivery, device(s) 110 at the location, lights controlled by the device 110, user consent to join the beaconing network). The system may retrieve the order information and the user account for the order.

At 308, the devices module 208 may determine that an IoT hub including a smart light is associated with the user account. Initially, the devices module 208 may interact with the user portal module 206 to serve as a device registration portal for the IoT hub before it is deployed or put to use. As part of registration, the devices module 208 may receive hub device information from the IoT hub itself or the hub device information may be manually added. The hub device information may include a unique identifier code, the hub type, the number of IoT devices the IoT hub is controlling including the number of light(s) 112, the type of light(s) 112, and the location of the IoT hub.

At 310, the beacon generator module 212 may generate beaconing information for the order, the beaconing information including at least one of a UAV identifier or order number. The beacon generator module 212 may generate beaconing information specific to the UAV that requested the location beacon. In some examples, the beacon generator module 212 may include a vehicle identifier, the order or task number, or any other identifier to tag the beaconing information with an intended recipient for a particular order, task, or vehicle. In response to receiving the beaconing data, the UAV may verify the intended recipient information.

At 312, the beaconing module 118 may transmit the beaconing information to the IoT hub. The devices module 208 may serve as a device gateway for the beaconing system network. Initially, the devices module 208 may interact with the user portal module 206 to serve as a device registration portal for the IoT hub before it is deployed or put to use. As part of registration, the devices module 208 may receive hub device information from the IoT hub itself or the hub device information may be manually added. The hub device information may include a unique identifier code, the hub type, the number of IoT devices the IoT hub is controlling including the number of lights, the type of lightbulb, and the location of the IoT hub. The devices module 208 may associate the unique device identifier code with a user account. The devices module 208 may transmit the beaconing information to the IoT hub for the beaconing system network.

Figure 4:
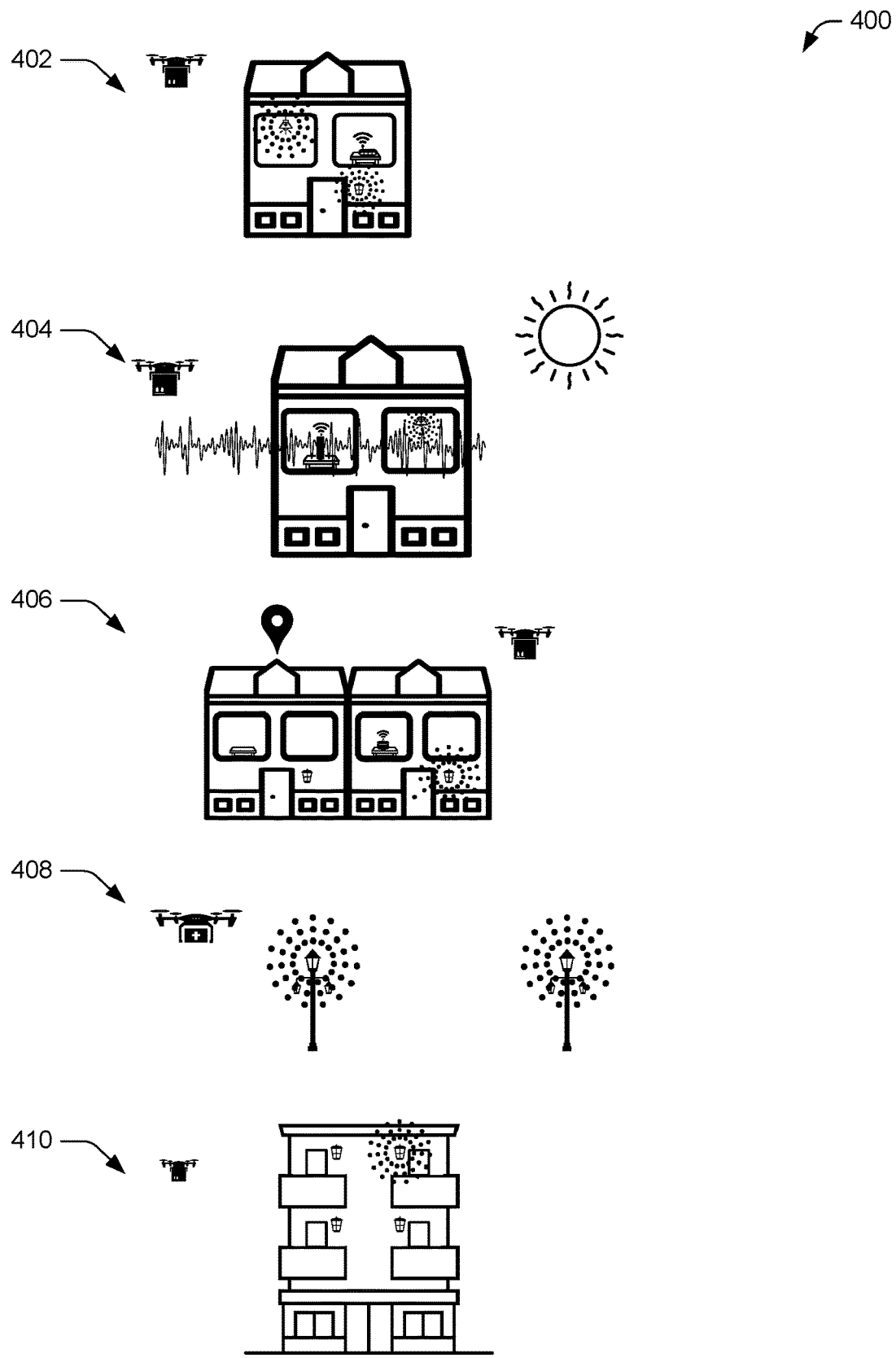
FIG. 4 is a schematic diagram showing examples of different locations having different beaconing configurations based on the pre-existing infrastructure available.

FIG. 4 is a schematic diagram showing example beaconing configurations 400 of different locations having different beaconing configurations based on the pre-existing infrastructure available. The example beaconing configurations 400 is a non-limiting example how the location identifying system may provide beaconing information based on the hubs and lights available at different locations. The beaconing module 118 may track and manage a beaconing system network and determine the beaconing method according to the different configurations in example beaconing configurations 400. The example beaconing configurations 400 may include the example beaconing configuration 402, the example beaconing configuration 404, the example beaconing configuration 406, the example beaconing configuration 408, and the example beaconing configuration 410.

In the example beaconing configurations 400, the beaconing module 118 may perform tasks related to determining a current location of the UAV, determining the smart device to send beaconing information to, and generating the beaconing information. In some examples, the beaconing module 118 may interact with the locator module 116 to determine that the UAV is not near a final destination, but rather needs interim navigation guidance by beaconing signals. Additionally, the beaconing module 118 may interact with the locator module 116 to determine the signal types to use based on location and lighting conditions.

The example beaconing configuration 402 may be a UAV delivering to a location having a smart hub at the target location, and the smart hub has at least two IoT controlled lights. In some examples, the beaconing module 118 may interact with the locator module 116 to determine that the UAV is near a final destination and needs a location identifying beaconing signals. The beacon generator module 212 may generate beaconing information specific to the UAV that requested the location beacon. In the example beaconing configuration 402, the smart hub may receive the beaconing information and cause all the lights that the hub is controlling to flicker the beaconing information at or near the same time.

The example beaconing configuration 404 may be a UAV delivering to a location having a smart hub at the target location, but due to the good weather with high ambient light level, the flickering of the IoT connected lightbulbs may be harder to detect from a distance. That is, the beaconing module 118 may interact with the locator module 116 to determine the signal types to use based on location and lighting conditions. If the locator module 116 determines that the lighting conditions creates a detectability issue, the sound module 216 may cause the smart hub to broadcast the sound data. The sound module 216 may be stored and configured to execute at the smart hub and modulate the beaconing information for audio broadcasting.

The example beaconing configuration 406 may be a UAV delivering to a location without a smart hub at the target location, but the neighboring property has a smart hub with at least one IoT controlled light. Initially, the user of the neighboring property has consented to joining the beaconing system network. Based on the UAV trying to deliver to a location that does not have a beaconing light on the property, the beacon generator module 212 may generate beaconing information that includes additional delivery instructions to direct the UAV to deliver to a specific neighboring property.

The example beaconing configuration 408 may be a UAV delivering emergency supplies to the scene of an emergency on the road. As an emergency service vehicle, the beaconing module 118 may have access to a public safety portal to control the street lights. The beaconing module 118 may similarly cause the street lights to flicker beaconing information to guide the UAV to the scene of the emergency.

The example beaconing configuration 410 may be a UAV delivering a package to a multi-unit building with balconies suitable for receiving packages. If the particular unit receiving the package or if the building is equipped with a smart hub controlling a light for the particular unit, the beaconing module 118 may cause the light for the particular unit to flicker.

FIG. 5 is a flow diagram of an illustrative process 500 for providing continuous location guidance beacons to guide a vehicle toward a destination. The process 500 is described with reference to the system 100 and may be performed by the content server(s) 108 in cooperation with any one or more of the UAV(s) 104 and device(s) 110. Of course, the process 500 may be performed in other similar and/or different environments.

At 502, the deployment module 218 may determine destination data associated with a task. The deployment module 218 may perform tasks related to deploying a vehicle and managing the modules pushed out before deploying the vehicle. In some examples, the deployment module 218 may transmit decryption keys to the vehicle to decrypt encrypted beaconing data and information that the vehicle will receive. In additional examples, the deployment module 218 may verify that the vehicle has the latest version of the sensor module 120. In particular, because the beaconing information may contain confidential information that may be unintentionally broadcasted to other light sensors, the deployment module 218 may verify that the vehicle has the correct decryption key.

At 504, the deployment module 218 may transmit the destination data to a vehicle. The deployment module 218 may serve as a gateway for the vehicles or devices on the vehicles. Initially, the deployment module 218 may interact with the UAV(s) 104 to provide task or order information including flight route and target destination before it is deployed.

At 506, the beaconing module 118 may receive location guidance request from the vehicle, the location guidance request including a current location data of the vehicle. The beaconing module 118 may interact with the locator module 116 to determine whether or not the vehicle is near a final destination based on the shipping address of the order and the current location data of the vehicle. Additionally, the beaconing module 118 may interact with the locator module 116 to determine the signal types to use based on location and lighting conditions.

At 508, the devices module 208 may identify an IoT hub within a threshold distance of the vehicle, the IoT hub including at least one light in a network. The devices module 208 may interact with the user portal module 206 to serve as a device registration portal for the IoT hub before it is deployed or put to use. As part of registration, the devices module 208 may receive hub device information from the IoT hub itself or the hub device information may be manually added. The hub device information may include a unique identifier code, the hub type, the number of IoT devices the IoT hub is controlling including the number of light(s) 112, the type of light(s) 112, and the location of the IoT hub.

At 510, the beacon generator module 212 may generate beaconing information for the IoT hub. The beacon generator module 212 may generate beaconing information specific to the vehicle that requested the location beacon. In some examples, the beacon generator module 212 may include a vehicle identifier, the order or task number, or any other identifier to tag the beaconing information with an intended recipient for a particular order, task, or vehicle. In response to receiving the beaconing data, the vehicle may verify the intended recipient information. The beacon generator module 212 may retrieve any specific delivery instructions associated with the user's account and the beaconing information may include the specific delivery instructions. The specific delivery instructions may specify a placement location to leave the package.

At 512, the beaconing module 118 may transmit the beaconing information to the IoT hub. The devices module 208 may serve as a device gateway for the beaconing system network. Initially, the devices module 208 may interact with the user portal module 206 to serve as a device registration portal for the IoT hub before it is deployed or put to use. As part of registration, the devices module 208 may receive hub device information from the IoT hub itself or the hub device information may be manually added. The hub device information may include a unique identifier code, the hub type, the number of IoT devices the IoT hub is controlling including the number of lights, the type of lightbulb, and the location of the IoT hub. The devices module 208 may associate the unique device identifier code with a user account. The devices module 208 may transmit the beaconing information to the IoT hub and may return to process 506 to receive additional location guidance requests from the vehicle.

FIG. 6 is a flow diagram of an illustrative process 600 for transmitting a request for location guidance, detecting a beaconing pattern, and determining the location based on the beaconing information. The process 600 is described with reference to the system 100 and may be performed by the UAV(s) 104 and/or in cooperation with any one or more of the content server(s) 108 and device(s) 110. Of course, the process 600 may be performed in other similar and/or different environments.

At 602, the UAV may receive location data associated with a task from the deployment module 218. The deployment module 218 may interact with the UAV to provide task or order information including flight route and target destination before it is deployed.

At 604, the UAV may determine that a current location is within a threshold distance from the location data. At least one or more components of locator module 116 may be stored and configured to execute at the UAV. The UAV may execute the locator module 116 to determine if the UAV is within threshold distance from the location data. The threshold distance may be dynamically determined based on lighting conditions, including but not limited to, the lumens of the lightbulbs, the level of brightness based on weather or time of day, and light pollution of the city lights. The locator module 116 may also determine the threshold distance based a current ambient light level received from a light sensor on the UAV. The threshold distance may increase if the system determines that the beaconing light may be detected from a greater distance and conversely, the threshold distance may decrease if the system determines that the beaconing light may be detected from a shorter distance.

At 606, the locator module 116 may transmit a location beacon request. The locator module 116 may determine if the UAV is within threshold distance to a delivery location to transmit a location beacon request.

At 608, the UAV may receive, from a sensor, beaconing information. The sensor module 120 may include computer vision algorithms to detect flickering light and determine beaconing information from the flickering. The sensor module 120 may also include computer vision algorithms to determine the property that is beaconing. In at least one example, at least one or more components of the sensor module 120 may be stored and deployed by the content server(s) 108 to execute at the UAV to receive encrypted beaconing data and to decrypt the beaconing data.

At 610, the UAV may determine that the beaconing information is associated with the task. The beacon generator module 212 generated the beaconing information specific to the UAV that requested the location beacon. For instance, the beacon generator module 212 may include a vehicle identifier, the order or task number, or any other identifier to tag the beaconing information with an intended recipient tag for a particular order, task, or vehicle. The UAV may receive the beaconing information and verify the intended recipient tag.

At 612, the UAV may determine that the property transmitting the beaconing information is associated with the task. The UAV received the location data associated with the task from the deployment module 218. The UAV may identify the source of the beaconing information, or the property transmitting the beaconing information, and verify the location data with respect to the property location.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   receiving, from an unmanned aerial vehicle (UAV), a destination guidance request associated with an order, wherein the destination guidance request includes current location data of the UAV;
   determining a delivery route associated with the order;
   identifying a first user account associated with the order;
   determining that the first user account is associated with a first Internet of Things (IoT) hub, the first IoT hub controlling one or more smart devices and failing to detect at least one smart light;
   identifying a second IoT hub from a beaconing network as an interim signaling beacon for the delivery route based at least in part on the first IoT hub, the beaconing network including a database of IoT hubs associated with user accounts that have provided consent to allow the beaconing network to access control over signaling capable devices to serve as the interim signaling beacon at an interim location, the user accounts include a second user account associated with the second IoT hub, the second IoT hub controlling a smart light;

generating beaconing information associated with the order based at least in part on at least one of the UAV or the order; and transmitting the beaconing information to the second IoT hub to cause the smart light to flicker for detection by the UAV.

2. The computer-implemented method as recited in claim 1, wherein the beaconing information includes a light flickering pattern for the smart light, the light flickering pattern flickering at a frequency undetectable by human eyes.

3. The computer-implemented method as recited in claim 1, further comprising:

determining that the current location data is within a threshold distance from the second IoT hub; and receiving a light flickering confirmation from the second IoT hub.

4. The computer-implemented method as recited in claim 3, further comprising:

receiving, from the UAV, a beaconing confirmation including at least a portion of the beaconing information;

verifying the at least a portion of the beaconing information; and transmitting delivery instructions to place package at a particular location based at least in part on the verifying.

5. The computer-implemented method as recited in claim 3, further comprising:

receiving, from the UAV, a second destination guidance request associated with the order; and transmitting sound data associated with the beaconing information to the first IoT hub.

6. A system comprising:

one or more processors; and memory storing computer-executable instructions that, when executed, cause the one or more processors to:

determine destination data associated with a task, the destination data including a delivery route;

transmit the destination data to a vehicle;

identify an Internet of Things (IoT) hub from a beaconing network as an interim signaling beacon that is within a predetermined distance of the delivery route, the beaconing network including a database of IoT hubs associated with user accounts that have provided consent to allow the beaconing network to access control over signaling capable devices to serve as the interim signaling beacon at an interim location, the user accounts including a user account associated with the IoT hub, the IoT hub including at least one light in a network;

determine that the IoT hub is within a threshold distance of a location of the vehicle;

generate beaconing information associated with the task for the IoT hub; and transmit the beaconing information to the IoT hub.

7. The system as recited in claim 6, wherein the computer-executable instructions that, when executed, further cause the one or more processors to receive a location guidance request from the vehicle, the location guidance request including the location of the vehicle.

8. The system as recited in claim 6, wherein the beaconing information includes modulated sound data of the beaconing information.

9. The system as recited in claim 6, wherein the beaconing information includes information identifying at least one of the vehicle or a task identifier.

10. The system as recited in claim 6, wherein the computer-executable instructions that, when executed, further cause the one or more processors to:

receive, from the vehicle, a receipt of beaconing data; and transmit delivery instructions to the vehicle.

11. The system as recited in claim 10, wherein the computer-executable instructions that, when executed, further cause the one or more processors to:

receive, from the vehicle, a delivery confirmation;

transmit the delivery confirmation to a second IoT hub; and cause the second IoT hub to announce the delivery confirmation.

12. The system as recited in claim 6, wherein the threshold distance is based at least in part on ambient light level captured by sensors onboard the vehicle.

13. The system as recited in claim 6, wherein the computer-executable instructions that, when executed, further cause the one or more processors to encrypt the beaconing information as beaconing data.

14. A computer-implemented method comprising:

receiving, from one or more computing devices, a destination associated with a task;

transmitting, to the one or more computing devices, an interim navigation guidance request;

receiving, using a sensor, first beaconing information broadcasted from a first light at an interim location, the first beaconing information includes a first light flickering pattern for the first light, the first light flickering pattern flickering at a frequency undetectable by human eyes, the first light associated with a user account that has provided consent to allow a beaconing network to access control over the first light to serve as an interim signaling beacon at the interim location, and the interim location being equal to or greater than a threshold distance from the destination;

determining, based at least in part on the first beaconing information, a navigation modification;

determining that current location data associated with the device places the device within the threshold distance from the destination;

transmitting, to the one or more computing devices, a location beacon request;

receiving, using the sensor, second beaconing information broadcasted from a second light at the destination, the second beaconing information includes a second light flickering pattern for the second light, and the second light associated with the beaconing network;

determining that the second beaconing information is associated with the task;

determining that the second light is located at a location of the destination;

determining that the second beaconing information includes delivery instructions that identify a placement location relative to the location to deposit a package; and causing the package to be deposited at the placement location.

15. The computer-implemented method as recited in claim 14, wherein the second beaconing information includes a task identifier associated with the task.

16. The computer-implemented method as recited in claim 14, wherein the first beaconing information is encrypted, and further comprising decrypting the first beaconing information with a decryption key associated with an intended recipient tag for the task received from the one or more computing devices.

17. The computer-implemented method as recited in claim 14, further comprising:
- transmitting, to the one or more computing devices, a beaconing confirmation including at least a portion of the first beaconing information; and
- receiving, from the one or more computing devices, the delivery instructions.

18. The computer-implemented method as recited in claim 17, further comprising:
- performing the task according to the delivery instructions; and
- transmitting, to the one or more computing devices, task complete confirmation.

19. The computer-implemented method as recited in claim 17, wherein the delivery instructions include a second location of a third light;
- navigating to the second location;
- receiving, using the sensor, third beaconing information broadcasted from the third light; and
- determining that the delivery instructions include the placement location relative to the second location.

20. The computer-implemented method as recited in claim 14, wherein receiving destination further comprising:
- receiving a flight plan traveling to the destination; and
- proceeding with traveling to the destination according the flight plan.

* * * * *